Oct. 7, 1969  C. R. FORD ET AL  3,470,768

DIFFERENTIAL ASSEMBLY

Filed Jan. 2, 1968  2 Sheets-Sheet 1

INVENTORS
CHARLES R. FORD
OLIVER S. DE HAVEN
EDWARD K. PERCIFIELD
BY Hood, Gust & Irish
ATTORNEYS INVENTORS
CHARLES R. FORD
OLIVER S. DE HAVEN
EDWARD K. PERCIFIELD
BY Hood, Gust & Irish
ATTORNEYS United States Patent Office 3,470,768
Patented Oct. 7, 1969

3,470,768
DIFFERENTIAL ASSEMBLY
Charles R. Ford, Indianapolis, Oliver S. DeHaven, Clayton, and Edward K. Percifield, Indianapolis, Ind., assignors, by mesne assignments, to Carlisle Corporation, Carlisle, Pa., a corporation of Delaware
Filed Jan. 2, 1968, Ser. No. 694,930
Int. Cl. F16h *1/40*
U.S. Cl. 74—713                                      7 Claims

ABSTRACT OF THE DISCLOSURE

A differential comprising a pair of aligned axles journalled in a housing formed by a pair of identical housing halves, first, second and third gear means disposed in the housing and differentially drivingly connecting the housing to the axles, and means for drivingly connecting a prime mover to the housing. The third gear means, which is meshed with the first and second gear means, is journalled in a cylindrical bearing surface defined by a half-cylindrical cut-out formed in each housing half. The mating face of each housing half is formed with a tenon extending axially and perimetrally one-half the distance therearound and a recess extending perimetrally the balance of the distance therearound so that, when said halves are joined, the tenon on each half is received in the recess in the other half, thereby accurately to position one half relative to the other half. Preferably, sleeve means is provided to hold the innermost ends of the axles in alignment, the sleeve means preferably being provided with extension portions engaging the housing to prevent rotational, axial or transaxial movement thereof.

It is a primary object of our invention to provide a differential assembly comprising a pair of axles which are identical except possibly for length, a housing formed by a pair of identical housing halves, four identical gears differentially drivingly connecting the housing to the axles and means, such as a sprocket, for drivingly connecting the housing to a driving means such as a motor. The parts comprising our differential assembly are easily fabricated and assembled to provide an economical differential assembly which is effective for the purpose intended.

Another object of our invention is to provide such a differential assembly wherein each housing half is formed, as its mating face, with a tenon extending perimetrally one-half the distance therearound and a recess extending perimetrally the balance of the distance therearound so that, when said halves are joined, the tenon on each half is rceived in the recess in the other half, thereby accurately to position one half relative to the other half.

With the exception of the means for drivingly connecting the housing to a driving means, our differential assembly is symmetrical with respect to the plane defined by the mating faces of the housing halves, which plane is perpendicular to the axes of the axles journalled in the housing. Preferably, each housing half is formed with a face on which a sprocket or the like can be mounted for the purpose of drivingly connecting the housing to a drive motor.

Still another object of our invention is to provide a differential assembly comprising sleeve means adapted to hold the innermost ends of the axles, i.e., the ends extending into the housing, in alignment, the sleeve means preferably being held in the housing in such a manner as to prevent its rotation, and axial and transaxial movement.

A further object of the invention is to provide, in such an assembly, a novel and inexpensive journal mounting for the planet gears.

Other objects and features of our invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
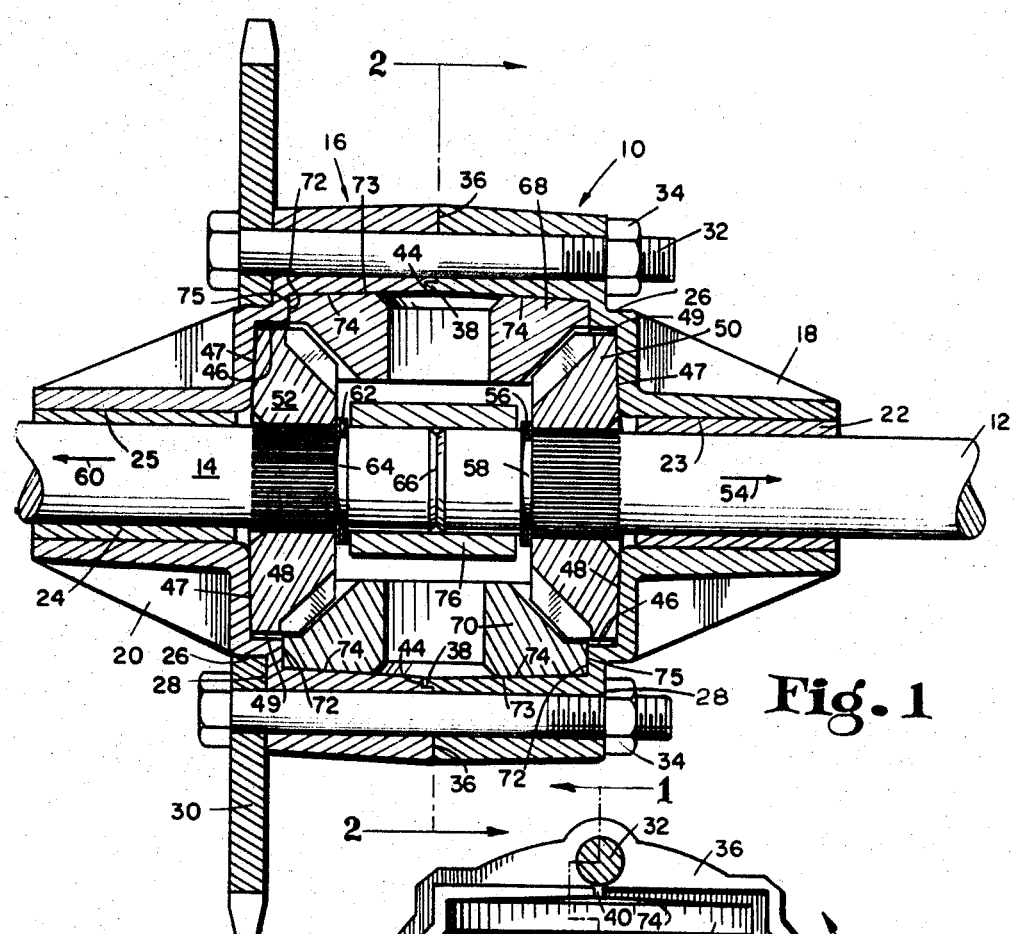
FIG. 1 is a sectional view of our differential assembly, the section being taken from FIG. 2 generally along the line 1—1.

Referring now particularly to the drawings, it will be seen that we have illustrated a differential assembly, indicated generally by the reference numeral 10, comprising a pair of axles 12 and 14 coaxially aligned and journalled in a housing, indicated generally by the reference numeral 16, formed by a pair of identical housing halves 18 and 20. Specifically, the axle 12 is journalled in a bushing 22 secured in a central opening 23 in the housing half 18 and the axle 14 is journalled in a bushing 24 which is secured in a central opening 25 in the housing half 20, the openings 23 and 25, of course, being in alignment.

In the preferred form of our invention, each housing half 18, 20 is formed by die-casting aluminum while its main bushing 22, 24 is positioned in the die mold. The bushings 22, 24 may be fabricated from any suitable bushing material such as bronze.

After the die-casting process, each housing half 18, 20 is preferably identically machined so that any two housing halves can be assembled to provide the housing 16.

Figures 5, 6, 7:
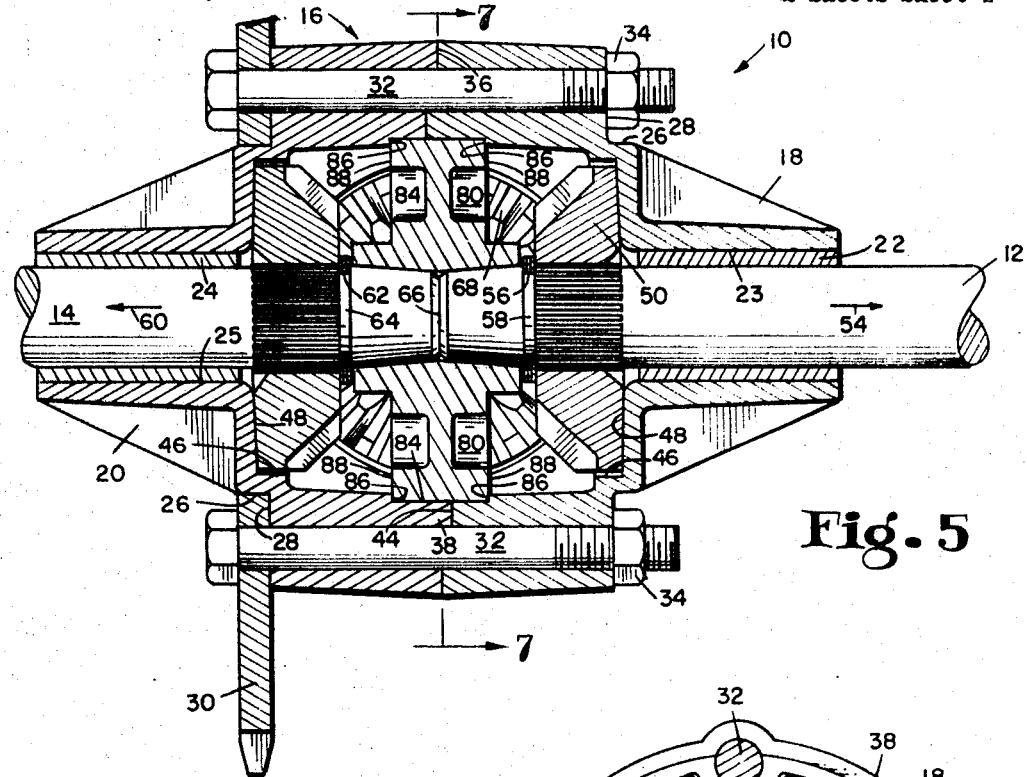
FIG. 5 is a sectional view similar to FIG. 1 except that the housing is rotated 90° about the axles and a different sleeve means for holding the innermost ends of the axles in alignment is illustrated.
FIG. 6 is a perspective view of the sleeve means illustrated in FIG. 5, which sleeve means is provided with keeper arms or extension portions which engage the housing to secure the sleeve means against rotational, axial and transaxial movement.
FIG. 7 is a sectional view taken from FIG. 5 generally along the line 7—7 to show the manner in which the sleeve means is received in the housing.

Each housing half 18, 20 is machined to provide the cylindrical mounting surface 26 bounded by the axes of the surface 26 and face 28 being coincident with the axes of the axles 12 and 14. A sprocket 30 is mounted on the surface 26 and against the face 28 of one of the housing halves 18, 20, as illustrated in FIGS. 1 and 5. Referring to FIGS. 1 and 5, it will be seen that we secure the sprocket 30 to the housing half 20 by means of the same bolts 32 which join the housing valves 18 and 20. A nut 34 is threaded onto each bolt 32 to engage the face 28 of the housing half 18. The sprocket 30 comprises an illustrative means for drivingly connecting the housing 16 to a drive motor or the like.

The mating face of each housing half 18, 20 indicated at the reference numeral 36 in FIGS. 1 and 5, is perpendicular to the axes of the axles 12 and 14. Preferably, these mating faces 36 are machined after the die-casting process so that the halves 18 and 20 can be joined to provide an enclosure which will hold grease-type lubricants.

Figure 2:
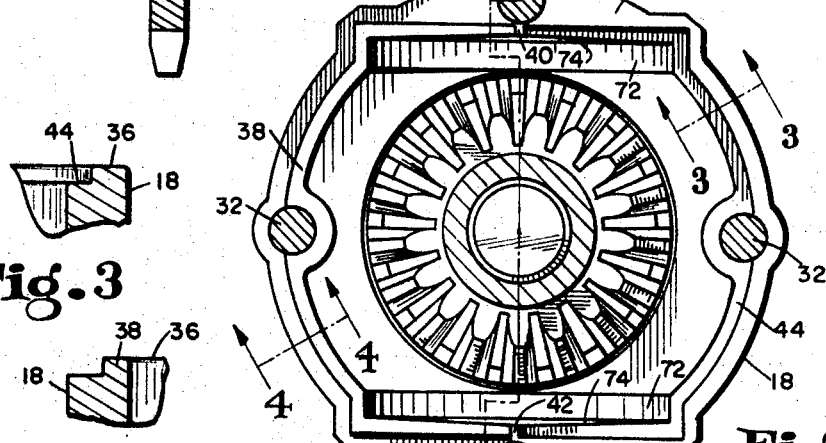
FIG. 2 is a sectional view taken from FIG. 1 generally along the line 2—2, this view showing the planet gears removed to expose the cavities defined by one housing half.
Figure 3:
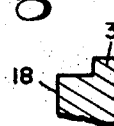
FIG. 3 is a fragmentary, enlarged, sectional view taken from FIG. 2 generally along the line 3—3 to show the cross section of the rabbet extending perimetrally one-half the distance around the mating face of the housing half.
Figure 4:
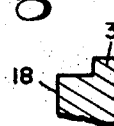
FIG. 4 is a similar view taken from FIG. 2 generally along the line 4—4 to show the cross section of the tenon which extends perimetrally about the balance of the mating face of the housing half.

The mating face of each housing half 18, 20 is machined to provide a tenon 38 extending perimetrally substantially one-half the distance therearound, i.e., from the small land indicated by the reference numeral 40 to the small land indicated by the reference numeral 42 in FIGS. 2 and 7. Further, the mating face 36 of each housing half 18, 20 is rabbeted to provide a recess 44 extending substantially the balance of the distance therearound, i.e., from the land 40 to the land 42 as shown in FIG. 2. When the housing halves 18 and 20 are assembled, the tenon 38 on each half 18, 20 is snugly received in the recess 44 in the other half 18, 20 thereby to position accurately one-half relative to the other half. Necessarily, each housing half 18, 20 is symmetrical about a plane extending through the center of the lands 40 and 42 so that the contour of each tenon 38 is identical with the contour of each recess 44.

Each housing half 18, 20 is formed to provide a generally cylindrically shaped recess 46 which is concentric with the bushing 22, 24 secured therein, the closed end surface 48 of this recess 46 being conically dished at an angle within the range from 1° to 5°. A bevel gear 50 is disposed in the recess 46 in the housing half 18 and an identical bevel gear 52 is disposed in the recess 46 in the housing half 20. The rear surface 47 of each bevel gear 50, 52 is conically tapered at an angle within the range from 1° to 5°, preferably at the same angle at which the surfaces 48 are conically dished, so that the engagement of such rear surface 47 with the surface 48 of the recess 46 in which the gear is disposed will tend to center the gear. The cylindrical surface 49 of each gear 50, 52 is formed at a radius less than the radius of the cylindrical wall of each recess 46 to provide the necessary clearance.

The gear 50 is splined or otherwise securely fastened on the inner end of the axle 12 for rotation therewith and the gear 52 is splined or otherwise securely fastened on the inner end of the axle 14 for rotation therewith. The axle 12 is prevented from moving axially in the direction of the arrow 54 by means of a conventional spiral ring 56 which fits in an annular groove 58 formed therein. Likewise, the axle 14 is prevented from moving axially in the direction of the arrow 60 by means of the conventional spiral ring 62 received in the annular groove 64 formed therein. In the illustrative embodiment, the innermost, bevelled ends of the axles 12 and 14, indicated generally by the reference numeral 66 (FIGS. 1 and 5) are in contact and, therefore, neither axle 12, 14 can move axially inwardly.

The axles 12 and 14 are differentially drivingly connected to the housing 16 by a pair of bevel gears 68, 70, the rotational axes of which are perpendicular to the axes of the axles 12 and 14. The gears 68 and 70 are disposed on opposite sides of the axles 12 and 14, as clearly seen in FIGS. 1 and 5.

Each housing half 18, 20 is formed and subsequently machined to provide a pair of oppositely disposed, half-cylindrical cut-outs 72 so that, when the halves 18 and 20 are properly assembled, the cut-outs 72 will define a pair of oppositely disposed cylindrical bearing surfaces for journalling the gears 68 and 70. Preferably, as illustrated, the end surfaces 74 of the cut-outs 72 are also conically dished at an angle ranging from 1° to 5°. The rear surfaces 73 of the gears 68 and 70 are, therefore, preferably conically tapered at an angle corresponding to the angle of the conically dished surfaces 74. The conically tapered surface 73 of each gear 68, 70 and the conically dished surface 74 of the cut-out 72 in which the gear is disposed will tend to center the gear as it is rotated. We have found that a 2° conical taper is quite satisfactory for the purpose intended. The cylindrical surface 75 of each gear 68, 70 is in bearing contact with the cylindrical walls of the cut-out 72 in which the bearing is received.

It will be apparent that the gears 50, 52, 68 and 70 are identical and interchangeable.

In the illustrative embodiment of FIGS. 1 and 2, a cylindrical sleeve 76 is arranged to receive the innermost ends of the axles 12 and 14 to hold the axle ends in alignment. Each axle must, of course, rotate freely relative to the sleeve 76. The sleeve 76 may be fabricated from any suitable bushing material such as bronze. The purpose of the sleeve 76 in holding the axle ends in alignment is to prevent the housing 16 from being subjected to excessive stresses when the axles 12 and 14 are subjected to flexing loads or forces. The sleeve 76 acts as an extension of each of the bushings 22 and 24. The sleeve 76 also prevents excessive gear wear which would be caused by the movement of one axle end transaxially relative to the other axle end.

Although the simple sleeve 76 is satisfactory for some applications, it may be desirable to secure such a sleeve in the housing 16 in such a manner that the sleeve will not rotate, nor move axially or transaxially. Thus, we have devised the sleeve means 78 illustrated in FIGS. 5, 6 and 7. Referring to those figures, it will be seen that the sleeve means 78 is provided with a pair of oppositely disposed, radially outwardly extending arm portions 80, the distal end portions of which are proportioned and arranged to engage the housing 16 to prevent rotational, axial or transaxial movement of the sleeve means 78.

Specifically, the distal end of each arm portion 80 is preferably cylindrical concave as indicated at 82 and the housing 16, i.e., each housing half 18, 20 is formed with a pair of radially oppositely disposed, generally cylindrically convex protrusions 84. When the sleeve means 78 is assembled into the housing 16, as seen in FIGS. 5 and 7, each protrusion 84 is snugly received in the concave end of a portion 80. Further, as clearly seen in FIG. 5, each housing half 18, 20 is preferably machined to provide shoulders 86 which engage the sides 88 of the portions 80 when the sleeve means 78 is assembled into the housing 16. It will be apparent that the engagement of the protrusions 84 with the ends of the portions 80 will restrain the sleeve means 78 from rotating or moving transaxially, and that the shoulders 86 will prevent the sleeve means 78 from moving axially. It will also be apparent that the sleeve means 78 is easily assembled onto the axle 12, 14 ends and into the housing 16 and that no fastening means, such as snap rings, clamps, screws, etc., are required to hold it in place.

Preferably, the bore of the sleeve means 78 will have a draft taper of approximately two degrees from the center line out in both directions and the innermost ends of the axles 12 and 14 will be correspondingly tapered. This tapered arrangement, which is suggested in FIG. 5, will facilitate disassembly of the axles 12 and 14 from the sleeve means 78 as well as die casting of the sleeve means.

What is claimed is:

1. A differential comprising a pair of axles, a housing formed by a pair of identical halves, said axles being coaxially aligned and journalled in said housing, first, second and third gear means disposed in said housing, said first gear means being mounted on the inner end of one of said axles for rotation therewith and said second gear means being mounted on the inner end of the other of said axles for rotation therewith, said third gear means being meshed with said first and second gear means, the mating faces of said housing halves joining in a plane perpendicular to the axis of said axles, the mating face of each half being formed with a tenon extending axially and perimetrally substantially one-half the distance therearound and a recess extending perimetrally substantially the balance of the distance therearound so that, when said halves are joined, the tenon on each half is received in the recess in the other half, thereby accurately to position one half relative to the other half, and means for drivingly connecting said housing to a driving means.

2. The differential of claim 1 further comprising sleeve means receiving the inermost ends of said axles, said sleeve means being effective to hold the axle ends in alignment with each axle being free to rotate relative to said sleeve means, said sleeve means being formed with a pair of oppositely disposed, radially outwardly extending portions, the outer ends of which are proportioned and arranged to engage said housing to prevent rotational, axial and transaxial movement of said sleeve means.

3. The differential of claim 2 in which the outer ends of said extending portions are generally cylindrically concave and in which said housing is formed with a pair of oppositely disposed, generally cylindrically convex protrusions, each protrusion being snugly received in one of the concave end portions, the axes of said protrusions being generally parallel with the axis of said sleeve means, and in which said housing is formed with radially inwardly extending shoulders at each end of each protrusion, said shoulders being engaged with said extending portions to prevent axial movement of said sleeve means.

4. The differential of claim 1 in which each half is formed to provide a cylindrical mounting surface bounded by a circular mounting face, the axes of which are coincident with the axes of said axles, in which said connecting means is a sprocket mounted on the cylindrical mounting surface and against the face of one of said halves, and further comprising a plurality of axially-extending bolts penerating said sprocket and said halves, and a nut associated with each bolt, said bolts and nuts being effective to join said sprocket and housing halves, sleeve means receiving the innermost ends of said axles and holding said axle ends in alignment, each axle being free to rotate relative to said sleeve means, said sleeve means being formed with a pair of radially outwardly extending portions, the outer ends of which are proportioned and arranged to engage said housing to prevent rotational, axial and transaxial movement of said sleeve means.

5. The differential of claim 4 is which the outer ends of said extending portions are generally cylindrically concave and in which said housing is formed with a pair of oppositely disposed, generally cylindrically convex protrusions, each protrusion being snugly received in one of the concave end portions, the axes of said protrusions being generally parallel with the axis of said sleeve means, and in which said housing is formed with radially inwardly extending shoulders at each end of each protrusion, said shoulders being engaged with said extending portions to prevent axial movement of said sleeve means.

6. A differential comprising a housing, a pair of axles coaxially aligned and journalled in said housing, first, second and third bevel gears disposed in said housing, said first gear being mounted on the inner end of one of said axles for rotation therewith and said second gear being mounted on the inner end of the other of said axles for rotation therewith, said third gear being journalled in said housing and meshed with said first and second gears drivingly to connect said housing to said axles, means for drivingly connecting the housing to a driving means, and sleeve means receiving the innermost ends of said axles and holding the axle ends in alignment, and said sleeve means being formed with a pair of radially outwardly extending portions, the outer ends of which are proportioned and arranged to engage said housing to prevent rotational, axial and transaxial movement of said sleeve means relative to said housing, and said axles being rotatable in said sleeve means.

7. The differential of claim 6 in which the outer ends of said extending portions are generally cylindrically concave and in which said housing is formed with a pair of oppositely disposed, generally cylindrically convex protrusions, each protrusion being snugly received in one of the concave end portions, the axes of said protrusions being generally parallel with the axis of said sleeve means, and in which said housing is formed with radially inwardly extending shoulders at each end of each protrusion, said shoulders being engaged with said extending portions to prevent axial movement of said sleeve means.

References Cited
UNITED STATES PATENTS

| | | | |
|---|---|---|---|
| 2,557,937 | 6/1951 | Buckendale | 74—713 |
| 3,330,169 | 7/1967 | Carrico et al. | 74–711 |
| 3,365,984 | 1/1968 | Musgrave | 74–713 |
| 3,406,592 | 10/1968 | Von Kaler | 74—713 X |

ARTHUR T. McKEON, Primary Examiner